Jan. 6, 1970 HIROSHI SUGAYA ET AL 3,488,646

ROTARY DISC UNIT

Filed May 2, 1968

INVENTORS
HIROSHI SUGAYA,
KENJI KANAI

BY Stevens, Davis, Miller & Mosher

ATTORNEYS

United States Patent Office 3,488,646

Patented Jan. 6, 1970

3,488,646

ROTARY DISC UNIT

Hiroshi Sugaya, Suita-shi, and Kenji Kanai, Higashi-Osaka-shi, Japan, assignors to Matsushita Electric Industrial Co., Ltd., Osaka, Japan, a corporation of Japan Filed May 2, 1968, Ser. No. 726,055
Claims priority, application Japan, May 11, 1967, 42/30,250; Feb. 1, 1968, 43/6,814
Int. Cl. G11b *5/00*
U.S. Cl. 340—174.1 3 Claims

ABSTRACT OF THE DISCLOSURE

A rotary disc unit for supporting a disc-like magnetic sheet in a magnetic recording and reproducing apparatus of the type wherein a signal is successively recorded on said disc-like magnetic sheet concentrically or spirally by rotating said magnetic sheet at high speed in contact with a magnetic head, said unit consisting of a rotary disc adapted to hold the magnetic sheet in tense condition through the intermediary of a predetermined air layer and provided therein with a through-hole communicating said air layer with the atmosphere to adjust the air pressure in said air layer so as to produce satisfactory contact between said magnetic head and said magnetic sheet.

BACKGROUND OF THE INVENTION

The present invention relates to a rotary disc which is adapted for use in a magnetic recording and reproducing apparatus of the type wherein a magnetic head is displaced intermittently or continuously in contact with a magnetic sheet rotating at a high rate to thereby record a signal on said magnetic sheet concentrical or spirally, and while maintaining a satisfactory contact between said magnetic sheet and said magnetic head.

In recording and reproducing a large amount of information, such as an image signal, it is essential to make the speed of a mangetic head relative to the recording medium extremely high. In this case, problems reside in the shortening of the service life of the head and recording medium and in the difficulty of obtaining a smooth and uniform contact between the head and the recording medium. It is particularly important in a disc recording and reproducing apparatus with which the present invention is concerned, to produce satisfactory contact between the head and the recording medium over a wire area of the disc.

The object of the present invention is therefore to obtain a satisfactory contact between the head and the recording medium over a wide area of the disc.

BRIEF DESCRIPTION OF THE DRAWING

The present invention will be described in detail hereinafter with reference to the accompanying drawings, in which.

DESCRIPTION OF THE PREFERRED EMBODIMENTS

Figures 1, 2, 3, 4, 5, 6:
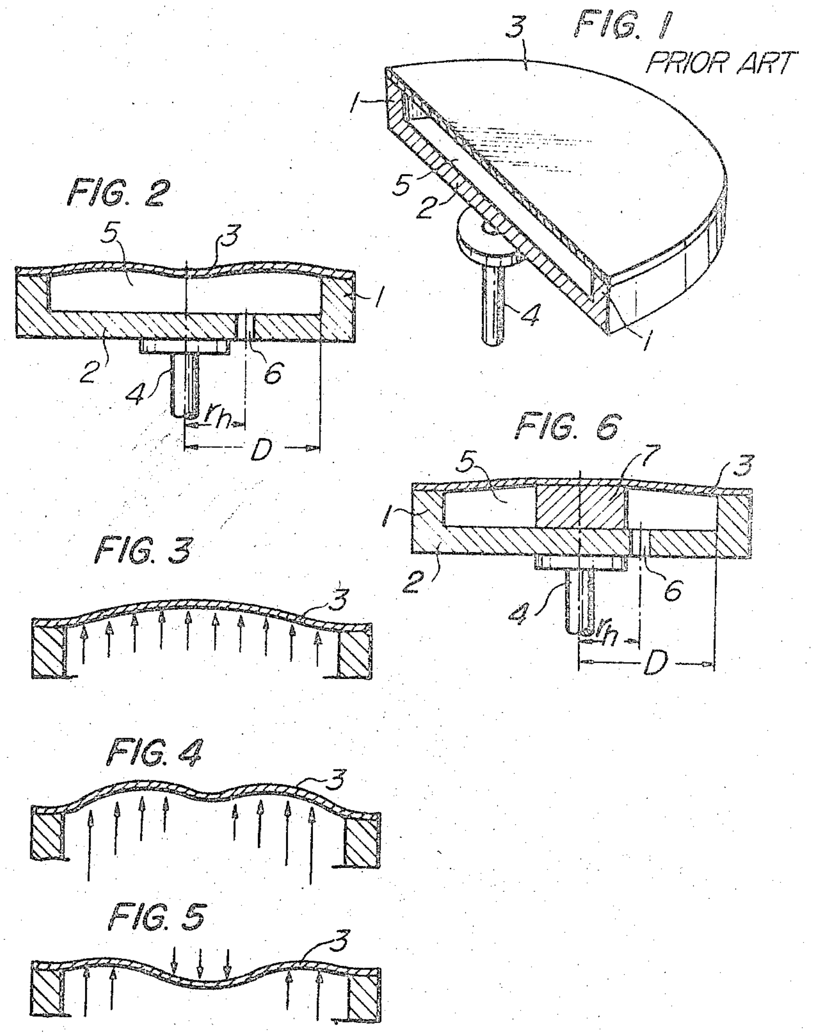
FIG. 1 PRIOR ART, FIG. 2, FIG. 3, FIG. 4, FIG. 5, FIG. 6
FIG. 1 is a perspective view, partly shown in section, of a conventional rotary disc unit.
FIG. 2 is a cross sectional side view of an embodiment of the present invention.
FIGS. 3 to 5 are a set of cross sectional side views for the purpose of explaining the present invention.
FIG. 6 is a cross sectional side view of another embodiment of the present invention.

According to the conventional rotary disc unit, as shown in FIG. 1, a magnetic sheet 3 is supported in tense condition on a supporting disc frame 2. The supporting disc 2 has the peripheral edges thereof upstanding as at

1 to produce an air layer 5 below the magnetic sheet 3 said air layer enabling the resiliency of the magnetic sheet 3 to be made use of to produce satisfactory contact between said head and said magnetic sheet.

In the described arrangement, however, even a slight gap between the peripheral edge of the magnetic sheet and the upstanding edge of the supporting disc will result in a reduction in pressure within of the air space 5 between said magnetic sheet and said supporting disc, upon rotation of the rotary disc unit about a rotary shaft 4, due to the air in said air space gradually leaking through said gap under the influence of the centrifugal force, and as a result, the magnetic sheet 3 sags at the central portion.

Therefore, if the arrangement is made such that the magnetic head travels radially of the magnetic sheet for recording or reproduction in a path which is parallel to the surface of said magnetic sheet in a stationary position, it is impossible to maintain satisfactory contact between the magnetic head and the magnetic sheet at the central portion as well as at the peripheral portion of said magnetic sheet during the operation.

In order to avoid such a lowering of pressure in the air space between the magnetic sheet 3 and the supporting disc frame 2, according to the present invention an air passage hole 6 is bored through the supporting disc frame 2 at a location $r_h$ spaced radially from the center of said disc frame, as shown in FIG. 2, for the adjustment of the pressure in said air space.

The number and relative positions of the hole 6 are determined so that the dynamic balance of the supporting disc frame may be maintained. Namely, the air passage holes 6 are provided in angularly equally spaced relation to the center of rotation. The diameter of the holes should not be so large as to produce a turbulent air flow between the magnetic sheet and the supporting disc frame.

When representing the atmospheric pressure by $P_0$, the density of air under standard conditions by $\delta_0$, the r.p.m. of the disc unit by $n$ and the gravitational acceleration by $g$, in the rotary disc unit of the structure described, the pressure $P_1$ in the central portion of said unit is expressed by:

$$P_1=P_0(1+qr_h^2)e^{-qr_h^2}$$

wherein $$q=2\pi^2\delta_0 n^2/P_0 g$$

and the pressure P at a point spaced radially at a distance of $r$ from the center of the supporting disc frame is expressed by:

$$P=P_0(1+qr_h^2)e^{q(r^2-r_h^2)}$$

On the other hand, when pressure is exerted uniformly on the surface of the magnetic sheet with the peripheral edge of said sheet secured to the supporting disc frame, the magnetic sheet bulges at the central portion as shown in FIG. 3. Therefore, it is obvious that by arranging so that the pressure is smaller at the central portion of the air space 5 and increasing progressively toward the peripheral portion during the rotation of the rotary disc unit, the area of the flat portion on the magnetic sheet will be increased and satisfactory contact between the magnetic head and the magnetic sheet will accordingly be secured over an increased area.

However, if the pressure is too high, the magnetic sheet will bulge as shown in FIG. 4, while if the pressure is too low, the magnetic sheet will sag as shown in FIG. 5. In the present invention, the pressure in the air space is adjusted so as to maintain the surface of the magnetic sheet as flat as possible as shown in FIG. 2, by properly selecting the locations of the air passage holes.

The pressure interior of the rotary disc unit becomes equal to the atmospheric pressure $P_0$ at a point on the circumference of a certain circle concentric to the center of rotation and the radius $r_0$ of such circle is given by the formula:

$$r_0=\left\{r_h^2+\frac{1}{q}\log_e(1+qr_h^2)\right\}^{1/2}$$

This radius is variable with the r.p.m. of the rotary disc unit and the elastic modulus of the magnetic sheet used, but in practice:

$$r_0=\sqrt{2}r_h$$

and therefore $$r_h=r_0/\sqrt{2}$$

Namely, the pressure interior of the rotary disc unit becomes equal to the atmospheric pressure at a point which is spaced radially from the center of rotation a distance $\sqrt{2}$ times the distance $r_h$ between the air passage hole 6 and the center of rotation, and is higher than the atmospheric pressure at a point outside of said point and lower at a point inside said point with respect to the center of rotation.

Thus, it will be understood that by providing the air passage holes at or inwardly of the points which are spaced from the center of rotation a distance $1/\sqrt{2}$ times the effective radius D of the magnetic sheet, it is possible to freely select a point on the magnetic sheet at which the interior pressure of the rotary disc unit becomes equal to the atmospheric pressure, and by suitably locating such a point it is possible to increase the flat area of the magnetic sheet during rotation.

The area of the flat portion on the magnetic sheet 3 may be further increased by keeping said magnetic sheet raised at the central portion by means of a cylindrical block 7, as shown in FIG. 6, which is provided centrally of the supporting disc frame 2 and has a height greater than the height of the upstanding peripheral edge 1 of said supporting disc frame. Namely, during the rotation of the rotary disc unit the surface position of the magnetic sheet is variable with the variation of the elastic modulus of the magnetic sheet or of the tension in said magnetic sheet, even when the positions of the air passage holes 6 are suitably selected, and such change in surface position is particularly remarkable at the central portion of the magnetic sheet. However, by the provision of the cylindrical block 7 as in the embodiment shown in FIG. 6, the central portion of the magnetic sheet is maintained in its raised position and thereby displacement of the magnetic sheet surface can be minimized even if change occurs in the degree of tension in the magnetic sheet or in the elastic modulus of said magnetic sheet. Further, as mentioned previously, the pressure in the air space 5 becomes progressively higher toward the periphery of the rotary disc unit and accordingly the magnetic sheet is lifted higher at a point closer to the peripheral edge thereof. Thus, the use of the cylindrical block to keep the central portion of the magnetic sheet higher than the peripheral edge portion is obviously advantageous in increasing the flat area of the magnetic sheet during the rotation of the rotary disc unit.

What is claimed is:

1. A rotary disc unit adapted for use in a magnetic recording and reproducing apparatus, which comprises a supporting disc frame having an upstanding peripheral edge and a magnetic sheet supported by the upstanding edge of said supporting disc frame in tense condition with an air layer formed between said sheet and the flat surface of said supporting disc frame, said supporting disc frame being provided with an air passage hole or holes communicating said air layer with the atmosphere.

2. A rotary disc unit adapted for use in a magnetic recording and reproducing apparatus, which comprises a supporting disc frame having an upstanding peripheral edge and a magnetic sheet supported by the upstanding edge of said supporting disc frame in tense condition with an air layer formed between said sheet and the flat surface of said supporting disc frame, said supporting disc frame being provided with an air passage hole or holes communicating said air layer with the atmosphere at points which are spaced radially from the center of rotation of said rotary disc unit at a distance $1/\sqrt{2}$ times the radius of said air layer or shorter.

3. A rotary disc unit adapted for use in a magnetic recording and reproducing apparatus, which comprises a supporting disc frame having an upstanding peripheral edge, a cylindrical block having a height greater than the height of the upstanding peripheral edge of said supporting disc frame and fixedly mounted on the central portion of said supporting disc frame, and a magnetic sheet supported by the upstanding edge of said supporting disc frame in tense condition with the central portion thereof raised by said cylindrical block and with an air layer formed between said sheet and the flat surface of said supporting disc frame, said supporting disc frame being provided with an air passage hole or holes communicating said air layer with the atmosphere at points which are spaced radially from the center of rotation of said rotary disc unit at a distance $1/\sqrt{2}$ times the radius of said air layer or shorter.

References Cited

UNITED STATES PATENTS

| | | | |
|---|---|---|---|
| 3,369,227 | 2/1968 | Boissevain | 340—174.1 |
| 3,336,583 | 8/1967 | Comstock | 340—174.1 |

LEONARD FORMAN, Primary Examiner

ROGER A. FIELDS, Assistant Examiner

U.S. Cl. X.R.

179—100.2